United States Patent
Conrardy et al.

(10) Patent No.: US 9,112,205 B2
(45) Date of Patent: Aug. 18, 2015

(54) TIERED BATTERY CABINET

(75) Inventors: William Conrardy, Elmhurst, IL (US);
Michael Osko, Elgin, IL (US);
Christopher Heinz, McHenry, IL (US)

(73) Assignee: C & C POWER, Carol Stream, IL (US)

( * ) Notice: Subject to any disclaimer, the term of this patent is extended or adjusted under 35 U.S.C. 154(b) by 0 days.

(21) Appl. No.: 13/354,822

(22) Filed: Jan. 20, 2012

(65) Prior Publication Data

US 2012/0117785 A1      May 17, 2012

Related U.S. Application Data (62) Division of application No. 11/346,042, filed on Feb. 2, 2006, now Pat. No. 8,100,271.

(51) Int. Cl.
*H01M 2/10* (2006.01)

(52) U.S. Cl.
CPC ........ *H01M 2/1077* (2013.01); *Y10T 29/49826* (2015.01); *Y10T 29/49948* (2015.01); *Y10T 29/49963* (2015.01)

(58) Field of Classification Search
CPC ........... A47F 5/10; A47F 5/106; A47F 5/108; A47F 5/005; A47F 5/0062; A47F 7/145; H01M 2/1077; H01M 2/1088; H01M 2/1072; H01M 2/1016
USPC ........... 211/49.1, 55, 13.1, 128.1, 130.1, 189; 429/99, 100, 62; 361/724, 725, 726, 361/727; 312/278, 351, 223.1
See application file for complete search history.

(56) References Cited

U.S. PATENT DOCUMENTS

| | | | | |
|---|---|---|---|---|
| 1,733,406 | A | * | 10/1929 | Goulet ............................ 40/312 |
| 1,823,396 | A | * | 9/1931 | Goulet ...................... 211/128.1 |
| 1,911,368 | A | * | 5/1933 | Kress ............................ 211/59.2 |
| 2,108,122 | A | * | 2/1938 | Hall .......................... 211/128.1 |
| 2,129,396 | A | | 9/1938 | Archer |
| 2,147,759 | A | | 2/1939 | Sulentic |
| 2,160,102 | A | * | 5/1939 | Hull ............................ 211/59.2 |
| 2,577,101 | A | | 12/1951 | Ball et al. |
| 2,781,918 | A | * | 2/1957 | Palm, Jr ..................... 211/128.1 |
| 2,798,617 | A | * | 7/1957 | Schreiber ........................ 108/32 |

(Continued)

FOREIGN PATENT DOCUMENTS

| DE | 87 02 779.8 | 9/1987 |
|---|---|---|
| DE | 41 16 253 C1 | 6/1992 |

(Continued)

OTHER PUBLICATIONS

Copy of International Search Report from PCT International Application No. PCT/US2007/001093 dated Sep. 18, 2007 (4 pages).

(Continued)

*Primary Examiner* — Stanton L Krycinski
(74) *Attorney, Agent, or Firm* — Brinks Gilson & Lione (57) ABSTRACT

An apparatus and method of mounting storage batteries are presented in which batteries in multiple tiers may be easily accessed for installation and servicing. A battery cabinet or relay rack has provision for multiple tiers of batteries spaced so that batteries may be inserted in each tier. The batteries are supported by a tray or other structure so that they are positioned to permit top access to the battery terminals mounted on the front or front to surfaces of the battery. Tiers are positioned further from the front of the relay rack as the height of the tier increases.

7 Claims, 7 Drawing Sheets

(56) References Cited

U.S. PATENT DOCUMENTS

| | | | |
|---|---|---|---|
| 2,959,715 A | | 11/1960 | Leonchick |
| D191,249 S | | 8/1961 | Gardner et al. |
| 3,102,640 A | | 9/1963 | Keller |
| 3,341,270 A | | 9/1967 | Sohl |
| 3,394,973 A | * | 7/1968 | Scott .......................... 312/262 |
| 3,628,807 A | * | 12/1971 | Fullington et al. ........... 280/79.3 |
| 4,073,556 A | | 2/1978 | Wilson, Jr. |
| 4,270,661 A | | 6/1981 | Rosenband |
| 4,274,547 A | | 6/1981 | Takagi et al. |
| 4,287,267 A | * | 9/1981 | Whittlesey et al. ............. 429/49 |
| 4,383,614 A | | 5/1983 | Miller |
| 4,518,088 A | * | 5/1985 | Passoni ........................ 211/26.2 |
| 4,540,222 A | | 9/1985 | Burrell |
| 4,754,369 A | | 6/1988 | Nilsson |
| 4,785,943 A | | 11/1988 | Deffner et al. |
| 4,801,023 A | | 1/1989 | Ecclestone |
| 4,925,038 A | | 5/1990 | Gajewski |
| 4,957,829 A | | 9/1990 | Holl |
| 5,049,701 A | | 9/1991 | Vowles et al. |
| 5,197,409 A | * | 3/1993 | Hammond ..................... 119/253 |
| 5,212,024 A | | 5/1993 | Klink et al. |
| 5,284,254 A | | 2/1994 | Rinderer |
| 5,295,591 A | | 3/1994 | Slater |
| 5,372,262 A | | 12/1994 | Benson et al. |
| 5,378,057 A | | 1/1995 | Bach et al. |
| 5,403,679 A | | 4/1995 | Stone |
| 5,589,290 A | | 12/1996 | Klink et al. |
| 5,593,048 A | | 1/1997 | Johnson |
| 5,867,372 A | | 2/1999 | Shie |
| 5,890,606 A | | 4/1999 | Kuipers |
| 5,979,672 A | | 11/1999 | Gemra et al. |
| 5,996,822 A | | 12/1999 | Hopkins |
| 6,003,692 A | | 12/1999 | Kozak |
| 6,006,925 A | | 12/1999 | Sevier |
| 6,053,114 A | | 4/2000 | Villanueva |
| 6,105,796 A | * | 8/2000 | Buchanan et al. ......... 211/128.1 |
| 6,123,266 A | * | 9/2000 | Bainbridge et al. ......... 236/49.3 |
| 6,202,860 B1 | | 3/2001 | Ludwig |
| 6,238,029 B1 | | 5/2001 | Marzec et al. |
| 6,257,427 B1 | * | 7/2001 | Schneid ........................ 211/189 |
| 6,310,783 B1 | | 10/2001 | Winch et al. |
| 6,396,242 B2 | * | 5/2002 | Choi et al. .................... 320/113 |
| 6,451,475 B1 | | 9/2002 | Sherwood |
| 6,475,659 B1 | | 11/2002 | Heimer |
| 6,481,582 B1 | | 11/2002 | Rinderer |
| 6,482,541 B1 | | 11/2002 | Bator, Jr. et al. |
| 6,499,817 B2 | | 12/2002 | Jermain |
| 6,598,270 B2 | | 7/2003 | Larsen et al. |
| 6,605,777 B1 | | 8/2003 | Anderson et al. |
| 6,629,737 B2 | * | 10/2003 | Wiggins ...................... 312/223.1 |
| 6,638,660 B2 | | 10/2003 | Stone et al. |
| 6,643,122 B1 | | 11/2003 | Fontana et al. |
| 6,644,481 B2 | | 11/2003 | Dean et al. |
| 6,719,150 B2 | | 4/2004 | Marraffa |
| 6,901,946 B2 | | 6/2005 | Frazier |
| 6,936,372 B1 | * | 8/2005 | Jagota et al. ..................... 429/50 |
| 6,951,288 B2 | | 10/2005 | Henderson |
| 6,955,268 B2 | * | 10/2005 | Waldron ........................ 211/51 |
| 7,124,771 B2 | | 10/2006 | Frazier |
| 7,323,271 B2 | | 1/2008 | Marraffa |
| 7,548,429 B2 | | 6/2009 | Miller |
| 7,575,828 B2 | * | 8/2009 | Marraffa ........................ 429/99 |
| 7,691,526 B2 | | 4/2010 | Frazier |
| 7,740,142 B2 | * | 6/2010 | Miller et al. ..................... 211/26 |
| 2002/0117942 A1 | | 8/2002 | Audibert et al. |
| 2002/0153814 A1 | | 10/2002 | Robideau |
| 2002/0192543 A1 | | 12/2002 | Heimer |
| 2003/0003350 A1 | | 1/2003 | Heimer et al. |
| 2004/0079714 A1 | | 4/2004 | Andrew et al. |
| 2004/0140276 A1 | * | 7/2004 | Waldron ........................ 211/51 |
| 2005/0058891 A1 | * | 3/2005 | Marraffa ........................ 429/99 |
| 2006/0091086 A1 | | 5/2006 | Canty et al. |
| 2007/0144981 A1 | | 6/2007 | Nguyen |
| 2007/0178369 A1 | | 8/2007 | Conrardy et al. |
| 2007/0278915 A1 | | 12/2007 | Conrardy et al. |
| 2008/0093958 A1 | | 4/2008 | Peterson |

FOREIGN PATENT DOCUMENTS

| | | | |
|---|---|---|---|
| DE | 44 07 156 C1 | 6/1995 | |
| EP | 158368 A2 * | 10/1985 | ............. A47B 47/00 |
| EP | 0 281 710 A1 | 9/1988 | |
| FR | 874.287 | 8/1942 | |
| JP | 59-160954 | 9/1984 | |
| JP | 60-236454 | 11/1985 | |
| JP | 2000-48788 | 7/1998 | |

OTHER PUBLICATIONS

May 21, 2010 Non-Final Office Action, U.S. Appl. No. 11/799,626 (18 pages).
Response to May 21, 2010 Non-Final Office Action, U.S. Appl. No. 11/799,626, filed in the PTO on Jun. 30, 2010 (13 pages).
Jul. 27, 2010 Final Office Action, U.S. Appl. No. 11/799,626 (19 pages).
Response to Jul. 27 2010 Final Office Action, U.S. Appl. No. 11/799,626, filed in the PTO on Aug. 24, 2010 (12 pages).
Jan. 24, 2011 Non-Final Office Action, U.S. Appl. No. 11/799,626 (19 pages).
Response to Jan. 24, 2011 Non-Final Office Action, U.S. Appl. No. 11/799,626, filed in the PTO on Apr. 15, 2011 (12 pages).
Non-Final Office Action for related U.S. Appl. No. 11/799,626, mailing date May 31, 2011.
Response to Office Action mailed May 31, 2011, in related U.S. Appl. No. 11/799,626, filed Oct. 28, 2011.
Final Office Action from co-pending U.S. Appl. No. 11/799,626, dated Jan. 4, 2012, 23 pages.
Amendment and Response to Final Office Action from co-pending U.S. Appl. No. 11/799,626, dated Mar. 6, 2012, 12 pages.
Advisory Action from co-pending U.S. Appl. No. 11/799,626, dated Mar. 15, 2012, 3 pages.
Non-Final Office Action from co-pending U.S. Appl. No. 11/799,626, dated Aug. 17, 2012, 21 pages.
Complaint filed by C&C Power, Inc. in the United States District Court for the Northern District of Illinois, dated May 3, 2012 (with Exhibits), 55 pages.
Defendant's Motion to Dismiss Plaintiff's Complaint, filed by C&D Technologies, Inc. et al. in the United States District Court for the Northern District of Illinois, dated Jul. 10, 2012, 91 pages.
Request for Inter Partes Reexmination of U.S. Appl. No. 8,100,271, filed with the United States Patent and Trademark Office, dated Sep. 14, 2012, 66 pages.
Office Action from US Re-Examination U.S. Appl. No. 95/002,323, dated Nov. 28, 2012, 40 pages.
Amendment and Response to Office Action from US Re-Examination U.S. Appl. No. 95/002,323, dated Jan. 25, 2013, 52 pages.
Requestor's Response to Patent Owner's Amendment and Response to Office Action from US Re-Examination U.S. Appl. No. 95/002,323, dated Feb. 22, 2013, 105 pages.
Amendment and Response to Final Office Action from Co-Pending U.S. Appl. No. 13/614,656, dated Sep. 18, 2013 (14 pgs).
N0n-Final Office Action from Co-pending U.S. Appl. No. 13/614,656, dated Oct. 3, 2013, (18 pgs).
Amendment and Response to Non- Final Office Action from Co-Pending U.S. Appl. No. 13/614,656, dated Mar. 4, 2014 (22 pgs).
Non-Final Office Action from co-pending U.S. Appl. No. 11/799,626, dated Feb. 20, 2014 (23 pgs).
Amendment and Response to Office Action from Co-Pending U.S. Appl. No. 11/799,626,dated Feb. 25, 2014 (7 pgs).
Request for Continued Examination in response to Advisory Action in Co-Pending U.S. Appl. No. 11/799,626,dated Mar. 23, 2012 (3 pgs).
Amendment and Response to Office Action from Co-Pending U.S. Appl. No. 11/799,626,dated Oct. 1, 2012 (10 pgs).
IEEE Guide for Batteries for Uninterruptible Power Supply Systems (IEEE Std 1184-2006) extract, 10 pp; The Institute of Electrical and Electronic Engineers, New York, NY, Sep. 2006.
NEC2005 "NFPA 70: National Electrical Code" extract, 4 pp; National Fire Protection Association, Quincy, MA, 2005.

(56) References Cited

OTHER PUBLICATIONS

Third Party Requestor Comments After Action Closing Prosecution; Dec. 18, 2013; Filed in Reexam Control No. 95/002,323, Patent No. 8,100,271; 36 pp.
Patent Owner Comments After Action Closing Prosecution; Nov. 18, 2013; Filed in Reexam Control No. 95/002,323, Patent No. 8,100,271; 44 pp.
Action Closing Prosecution (Nonfinal) Issued Oct. 18, 2013; 72 pp.
Third Party Requester Comments After Non-Final Decision; Sep. 6, 2013; Filed in Reexam Control No. 95/002,323, Patent No. 8,100,271; 32 pp.
Response After Nonfinal Action—Owner Timely; Aug. 9, 2013; Filed in Reexam Control No. 95/002,323, Patent No. 8,100,271; (60 pgs).
Reexamination Non-Final Action Issued Jun. 5, 2013; (32 pgs).
Third Party Requester Comments After Nonfinal Action Feb. 22, 2013; Filed in Reexam Control No. 95/002,323, Patent No. 8,100,271 (105 pgs).
Response After Nonfinal Action—Owner Timely; Jan. 25, 2013; Filed in Reexam Control No. 95/002,323, Patent No. 8,100,271; (51 pgs).
Determination Reexam Ordered; Issued Nov. 28, 2012; (37 pgs).
Amendment and Response to Final Office Action in related U.S. Appl. No. 13/614,656, filed Nov. 19, 2014 (119 pgs).
Patent Owner's Appeal Brief from US Reexam Control No. 95/002,323, dated Sep. 15, 2014 (58 pgs).
Respondent's Brief Pursuant to 37 C.F.R. § 41.68 for US Reexam Control No. 95/002,323, dated Oct. 14, 2014, (25 pgs).

\* cited by examiner

TIERED BATTERY CABINET

The present application is a divisional application of U.S. application Ser. No. 11/346,042, filed Feb. 2, 2006, issued as U.S. Pat. No. 8,100,271, which is incorporated herein by reference

TECHNICAL FIELD

The present application may relate to an apparatus for retaining storage batteries, and more specifically to an apparatus which may permit convenient access to the battery terminals.

BACKGROUND

Battery cabinets or battery racks are used to house groups of storage batteries and ancillary equipment and may be a component of battery backup systems as used in telephone, computer and other systems requiring auxiliary or uninterrupted power. The batteries may be required to supply high currents. As the batteries have a finite lifetime, and the connections to the batteries require servicing, such as verifying or resetting the torque of the connection, easy access to the battery terminals and to the batteries for servicing and replacement is desired.

Where the batteries are arranged so as to be disposed in rows situated directly above each other, the structure of an upper battery interferes with access to a lower battery, particularly with respect to the battery terminals, which are difficult to access if they are disposed on the top surface of the battery. A large vertical space may have to be provided between adjacent tiers of batteries to permit clearance for servicing tools such as wrenches and the like. Such an arrangement increases the height of a battery cabinet or rack and has undesirable economic and ergonomic consequences. Alternatively, the terminals of the batteries may be disposed on a front surface of the battery. Even with such a construction, the placement of the batteries in vertically oriented tiers directly above one another limits access for tools, requiring extension parts for the tools or specialized fasteners.

In another configuration, the battery connection terminals may be at the top of the battery, but extended to the front face of the battery by "L"-shaped brackets. In this circumstance, one end of the "L"-shaped bracket is bolted to the battery terminal on top of the battery, and the battery cable is bolted to other end of the bracket at the front face of the battery; such construction increases the number of joints or connections, increasing the circuit resistance and involving more maintenance and reduced reliability.

The servicing of batteries by replacement, and the maintenance of the installation, involving inspecting, torquing or otherwise tightening the cable connections to the batteries would be facilitated if convenient top access to a portion of the battery at one end thereof, where the battery terminals are located was provided.

SUMMARY

An apparatus is disclosed where a battery cabinet or battery rack is provided. Generally, the terms battery rack and battery cabinet are used interchangeably herein. The battery cabinet is capable of accepting a plurality of batteries which may be positioned on a plurality of supports in a tiered arrangement such that a front surface of the batteries in each tier of batteries is set back further from the front of the cabinet as the tier rank as measured from the base of the cabinet, increases. The set back between successive tiers is dimensioned such that access to battery terminals on successive tiers is facilitated. In this manner, the battery terminals on the each battery may be accessed from either the top or the front thereof for servicing of the connections and replacement of the batteries. Individual batteries may be connected and disconnected from system cables and busses, and individual batteries may be removed or inserted in predetermined positions in the battery cabinet. Batteries of simple form factor, where the terminals need not be recessed from the battery top surface are also usable. Batteries with the terminals on the front thereof may also be used in this arrangement.

DETAILED DESCRIPTION

Exemplary embodiments may be better understood with reference to the drawings, but these examples are not intended to be of a limiting nature. Like numbered elements in the same or different drawings perform equivalent functions.

Figure 1:
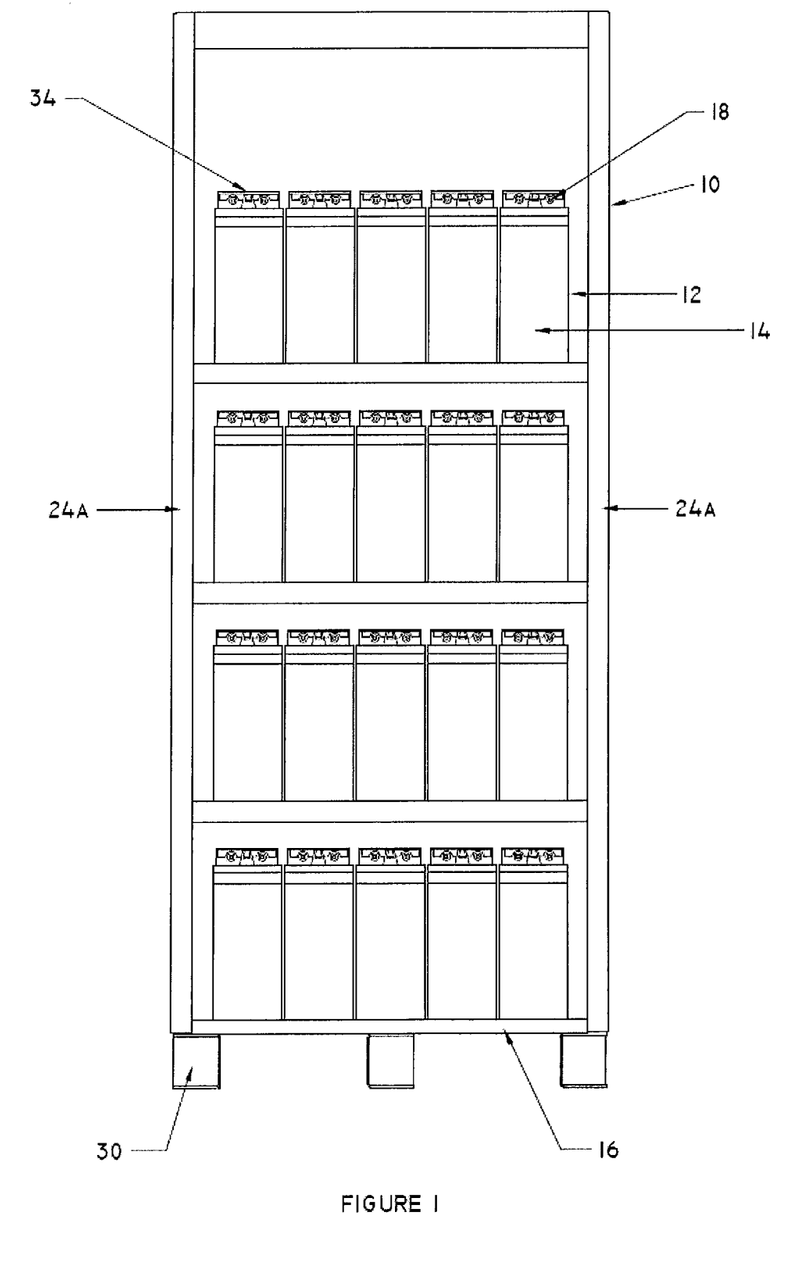
FIG. 1 illustrates a front elevation view of a battery cabinet.

FIG. 1 illustrates a front elevation view of a battery cabinet 10 for mounting a plurality of storage batteries 12 as may be provided in a back-up battery power supply or similar application requiring a plurality of batteries being connected in series, in parallel, or in some combination of connection configurations. The batteries may all be of the same capacity and type, but this is not required. Not all features of a battery cabinet are shown, and a battery cabinet may include doors or removable panels providing access from the front, side, and rear thereof; brackets, bars, lips or tie downs to prevent the batteries from being dislodged during seismic events; circuit breakers, battery chargers, and battery monitors, fuses and other accessories as are known in the art. Such accessories are optional and may be added as desired to meet specific design requirements. The front and rear doors and side panels, connecting cables and ancillary equipment, except for the batteries, are typically not shown in the figures herein in order to avoid excessive detail.

Rack or cabinet mounted electrical or electronic equipment and enclosures or mounting arrangements for such equipment may be designed in accordance with industry standard dimensions and configurations, so as to be more economically produced by multiple manufacturers. Such a standard dimensional measure for the vertical separation of units is a Rack Unit (RU) as standardized by the Electronic Industries Association (EIA), where 1RU is a distance of 1.75". Mounting hole patterns may also be standardized, such as the EIA 1032 hole pattern. While such standardized dimensions are economically useful, and often used to describe physical objects as, for example, a 19" relay rack, or a device that is 7RU high, nothing in the use of such terms in the description or figures herein is intended to require or suggest that the dimensions of any aspect of the apparatus conform to any industry standard, nor is compliance to such standards precluded.

Figure 2:
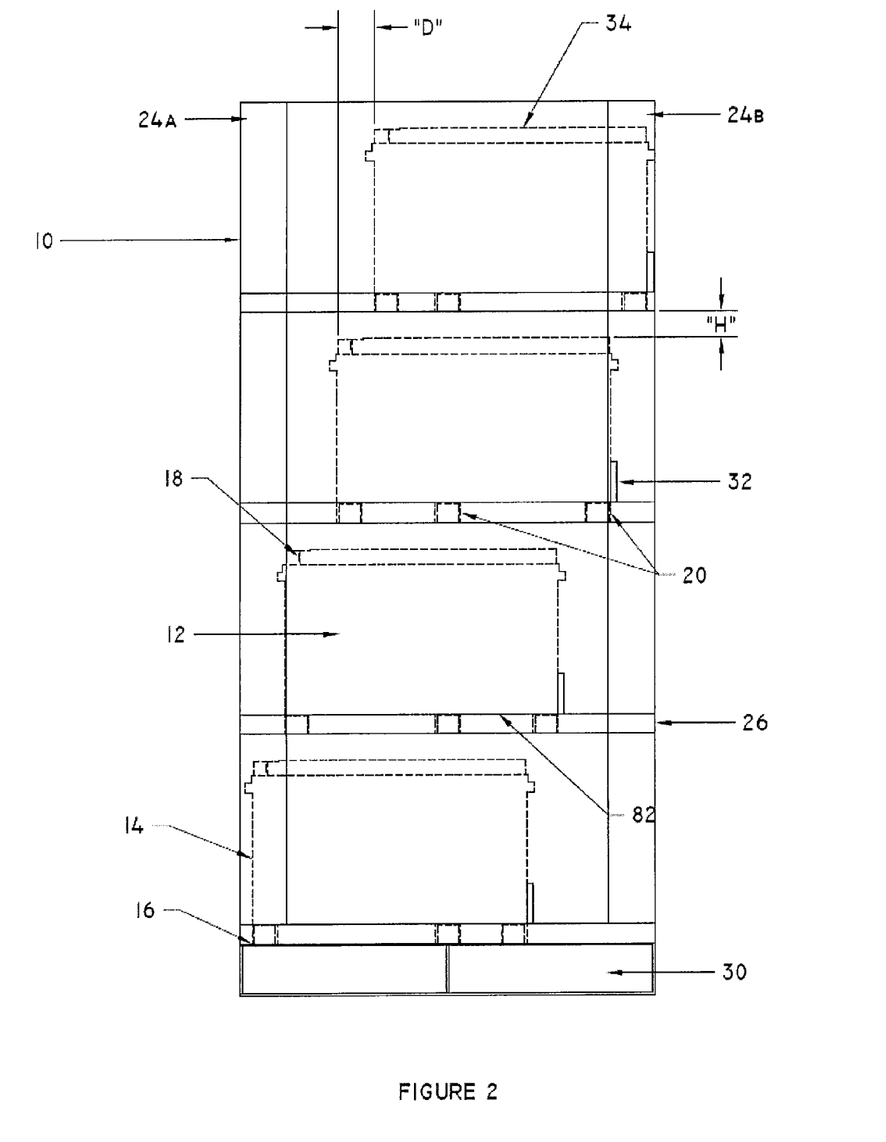
FIG. 2 illustrates a side elevation view of the battery cabinet of FIG. 1.

In a side elevation view of the battery cabinet 10 as illustrated in FIG. 2, the batteries 12 are disposed such that a front surface or end 14 of each battery in successively higher tiers, as measured from the bottom 16 of the battery cabinet 10, is disposed further from the front opening of the battery cabinet 10. The set-back distance D between the front ends 14 of the batteries 12 in successive tiers is sufficient that access from a top direction or a front direction is afforded to the connection terminals 18 on each of the batteries 12 or to a front 14 of a battery 12. The distance D may be chosen depending on the construction of the batteries, the choice of a connector type for the battery interface terminals, and other ergonomic considerations, including the types of servicing tools that are desired to be used.

When compared with a cabinet or rack arrangement where the battery tiers are arranged with each successive tier directly above each other, and having a depth L measured from the front to the back of the battery assembly overall, having N tiers, the overall depth of the enclosure in this example may be increased by approximately $D*(N-1)$.

Each tier of batteries is supported by one or more mechanical supports which may extend between opposite sides of the battery cabinet. Such supports may be transverse elements 20 in the form of "U" channels, "L" channels, box beams or any such structure capable of supporting the battery weight without permanent deflection of the support or damage to the battery, and which meet customer structural requirements or applicable civil or industry codes. A sufficient number of mechanical supports may be provided under each battery 12 so that, as the battery is slid into the tier, there is little or no tendency for the battery lower surface 82 to drop below the plane established by the top surface of the supports 20.

For a battery cabinet or rack, such as in FIGS. 1 and 2, the transverse horizontal supports 20 may be connected to a network of vertical supports 24 near each side of the cabinet, and the vertical supports 24 may be fixedly connected to the base 16 by bolting, welding, or the like. The vertical supports 24 may be disposed at the four corners of the cabinet or rack, or supports, disposed at one or more locations along the side of the cabinet, and intermediate between the front and rear of the cabinet.

The base 16 may be a beam structure, skid structure, or the like, having an outline in plan view substantially corresponding to the plan view dimensions of the cabinet 10. The base may include a plurality of box beams 30 to raise the base 16 off of a supporting floor, and may facilitate the movement of the battery cabinet 10 by a fork lift or the like. Any configuration of base structure may be used which directly or indirectly connects to the vertical supports 24 a, b. The vertical supports 24 serve to support the horizontal structures 20, 26 extending therebetween so as to provide one or more planes or tiers for supporting the batteries in a horizontal plane defining a tier.

The battery cabinet 10, whether empty, partially or fully loaded with batteries 12, may be configured such that a center of gravity of the entire assembly, in plan view, is within a perimeter of the base 16. This has the effect of maintaining the stability of the battery cabinet 10, and batteries 12 may be loaded or unloaded from the battery cabinet 10 in any sequence. One means of ensuring that the center of gravity of the battery cabinet 10 or battery rack remains within the plan view periphery of the base 16 is to dimension the base 16 so that the perimeter of the base encloses within the projection of the plan view of the cabinet 10 the outlines of all of the batteries 12 which may be loaded into the cabinet 10 or rack. The perimeter of the base 16 may be rectangular, for example.

The transverse horizontal supports 20 are further supported by longitudinal supports 26 joining front and rear vertical supports 24 a, b along each side of the cabinet 10. The connections between the transverse 20, longitudinal 26, and vertical 24 supports may be by a nut and bolt, screws and tapped screw holes, welding, or the like, or a combination thereof, so as to form a fixedly connected truss-like structure of beams and surfaces to support the batteries 12. A retaining plate 32 may be connected between the longitudinal members 26 at each tier to restrain the battery 12 from sliding backwards more than a desired distance in each tier. A similar retaining plate or structure (not shown) may be installed at the front of each battery 12, after a tier of batteries 12 has been installed in the cabinet.

A vertical separation distance H between the top 34 of a battery 12 of one tier and the bottom 82 of a battery 12 of the next higher tier may be reduced to that required for the battery support structures 20. The battery support structures 20, 26 may be replaced by a tray, further reducing the spacing distance H. Vertical rails may be used in place of the longitudinal supports 26 and the tray may be used in place of the transverse supports 20. A clearance between the top of a battery 12 and the longitudinal support structure 26 for the next highest tier is shown, but may not be needed, with only a clearance between the top 34 of the battery 12 and the horizontal support members 20 being provided.

Figure 3:
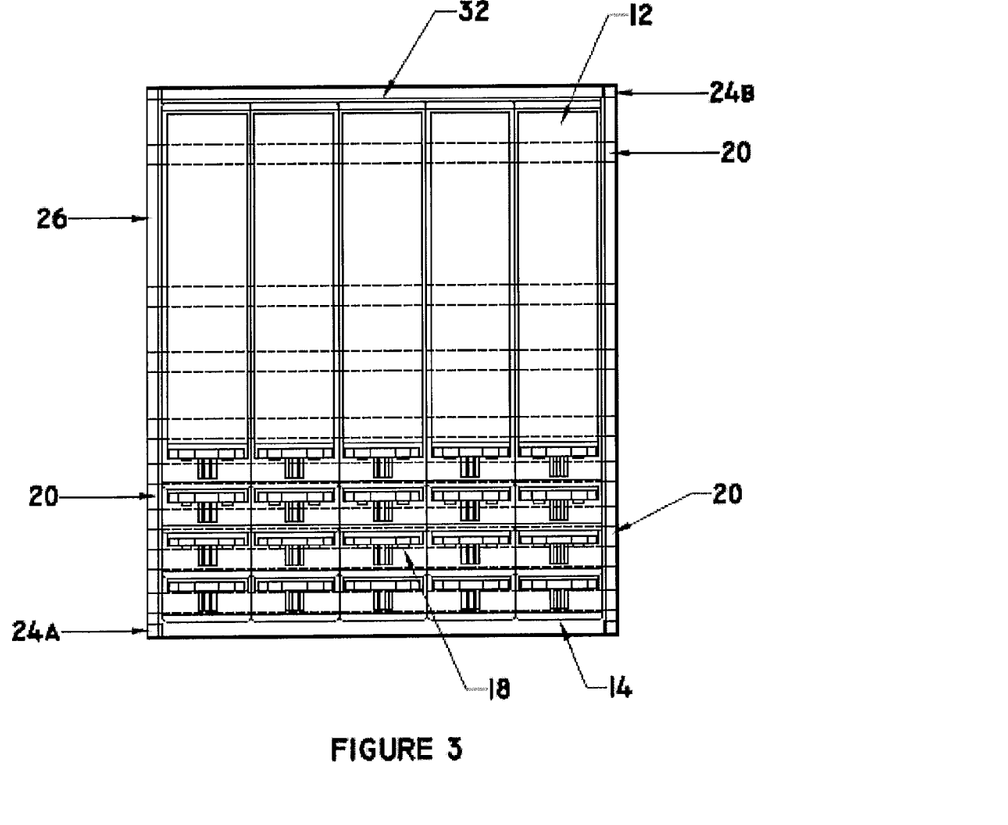
FIG. 3 illustrates a top plan view of the battery cabinet of FIG. 1.

FIG. 3 is a top view of the assembly of FIGS. 1 and 2 and shows four tiers of batteries, where each higher tier is disposed with a set back distance D. It may be seen that top mounted access terminals 18 are visible from above and can be conveniently accessed from above by tools for servicing.

Figure 4:
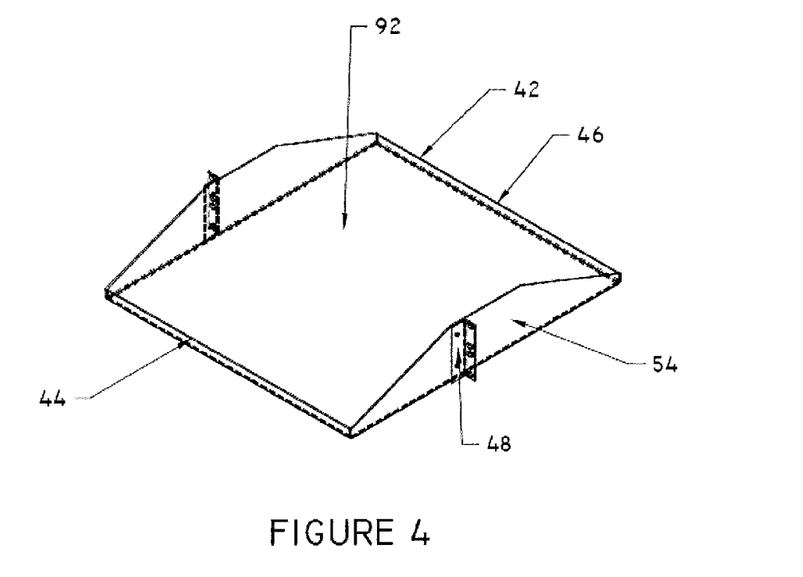
FIG. 4 illustrates a tray for supporting a tier of batteries.

In another example, as shown in FIG. 4, each battery tier may be supported by a tray 46, the tray being fabricated so as to be capable of supporting the weight of the batteries 12 without permanent deformation or deflection. Alternatively the tray may be of a lesser strength and be supported by the same types of structures as shown in FIG. 2, or the tray may be manufactured with integral beams of the types previously described so as to form a unitary structure. The tray 46 may have either a front retaining portion 88 (see FIG. 6) or front lip 44 and either a rear retaining portion or a rear lip 42 to assist in retaining the battery 12 in the battery cabinet 10. Such retention may be a requirement in geographical areas subject to seismic effects, or to meet other safety or industry codes. The front lip structure 44 may bend downwards, or be omitted entirely, and the rear lip structure 42 may bend upwards. Such an arrangement may facilitate inserting and removing the batteries 12 through the front portion of the battery cabinet 10.

A battery 12 may be inserted into a tier through the front of the battery cabinet 10, and slid in a rearward direction until the motion is resisted by the rear lip 42, thus positioning the battery 12 in the tier. Once the batteries 12 have been installed in a tier, a front retaining plate 52 or rod may be installed. The battery retaining devices 52, 42, 44 may be fabricated from metal or a suitable high strength material such as Kevlar.

Figure 5:
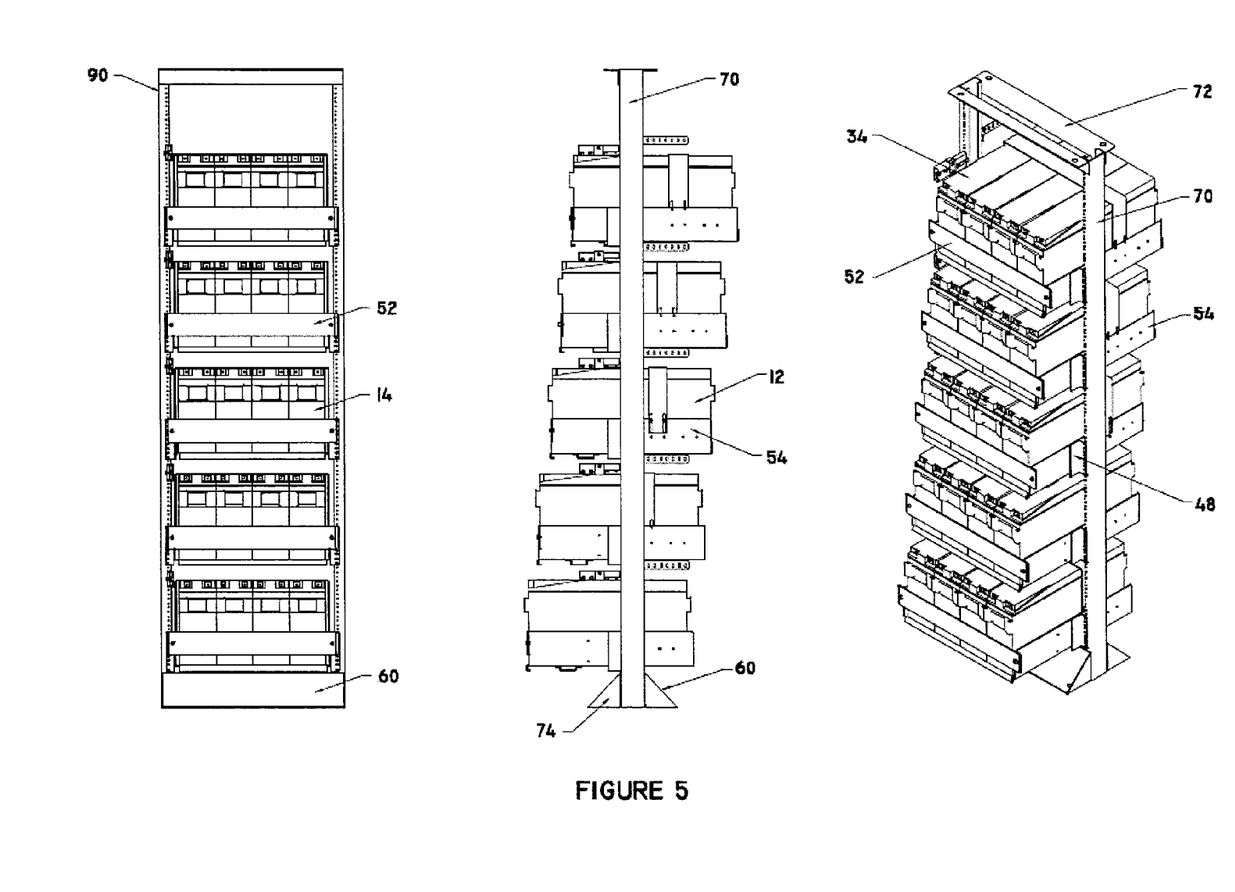
FIG. 5 illustrates a battery rack with trays and batteries installed.

In another example, the batteries may be supported by a battery rack 90. As shown in FIG. 5, the battery rack 90 includes a base 60, vertical side members 70 and, optionally, a top member 72 connecting opposing vertical side members 70. A gusset plate 74 may be fitted where the base 60 and the vertical members 70 join, so as to increase the strength and rigidity of the joint. The vertical supports 70 have mounting holes provided therein, disposed such that an attachment bracket 48 may be fastened thereto. This arrangement may also be used in a cabinet installation.

Figure 6A:
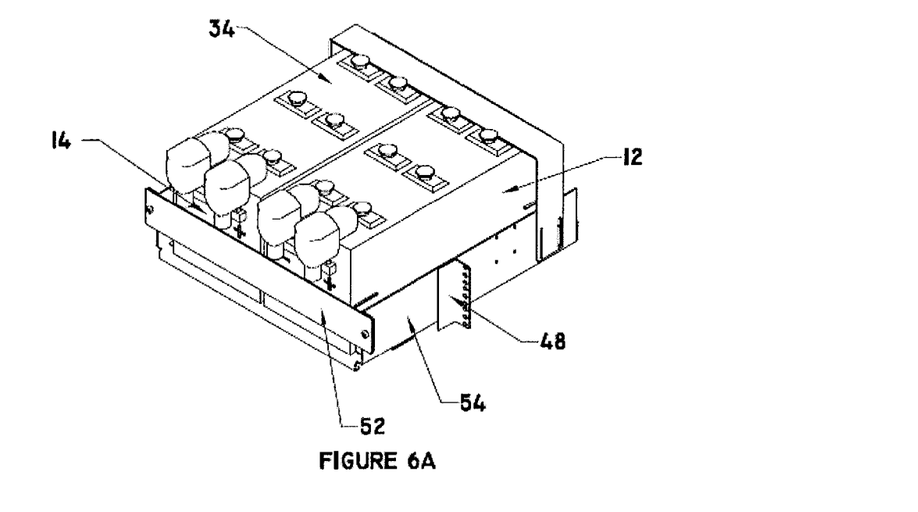
FIG. 6A illustrates another tray for supporting a tier of batteries.
Figure 6B:
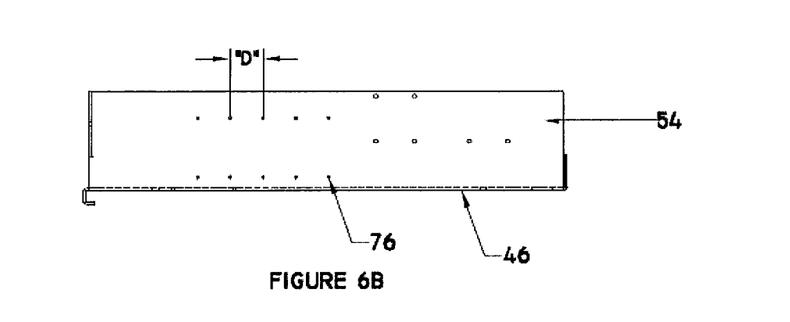
FIG. 6B illustrates a side view of the tray of FIG. 6A with a hole pattern suitable for a single vertical support on each side.
Figure 6C:
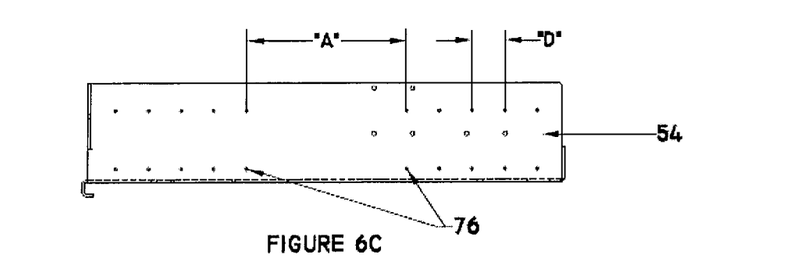
FIG. 6C illustrates a side view of the tray of FIG. 6A with a hole pattern suitable for two vertical supports on each side.

The tray structure shown in FIG. 4 may be used for accommodating batteries 12 in the rack 90. FIG. 6 shows an example of another tray structure 46 which may be suitable for use with the battery cabinet 10 or rack 90. The tray bottom surface 92 supports the batteries 12, and a front and rear lip as previously shown, or a retaining plate 52 may be provided to retain the batteries 12. Each side of the tray 46 is provided with a side surface 54, perpendicular to the bottom surface 92. The side surface 54 may be provided with a plurality of mounting holes 76 to which an attachment bracket 48 may be fastened. Groups of the plurality of holes for attaching the attachment bracket 48 to the side surface 54 may each be spaced at a distance D, corresponding to the distance increment by which successive tiers may be set back by a horizontal distance from each other. The hole pattern in the side plate shown in FIG. 6B may be suitable for connecting to a rack having a single vertical member on each side, whereas the hole pattern shown in FIG. 6C may be suitable for mounting to a rack structure which has two vertical members 70 on each side, with a distance A between centers. Where there are two vertical members on each side, the groups horizontal rows of holes may be pairs of holes, each pair of holes having a separation distance equal to A. A horizontal distance between the first of each of two pairs of holes is the spacing D.

Each battery tray 46 may be mounted to the vertical supports by attaching the battery tray attachment brackets 48 to the corresponding vertical supports 70 with screws, nuts and bolts or other fasteners, by welding or by a combination of techniques. For example, the lowest battery tray is attached to the vertical supports so that the front lip 44 of the battery tray 46 is at a front most position with respect to the base. The second battery tray is mounted to the vertical supports such that the front lip of the second battery tray is disposed a distance D further from the front of the assembly than that of the lowest battery tray. The remainder of the battery trays 46 may be mounted in a similar manner. The difference in height H between successive battery trays 46, corresponding to battery tiers, is at least the height of a battery 12.

The center of gravity of each battery tray 46, when loaded with batteries, may be forward or behind the attachment bracket 48, depending on the tier height, and the sizing and dimensioning of the tray sides 54 and the attachments 48 are suitable to resist the bending torque as well as the weight or the tray and batteries. The overall disposition of the batteries 12 may result in a center of gravity for the assembly that lies near the plane passing though the two opposing vertical members 70.

Figure 7A:
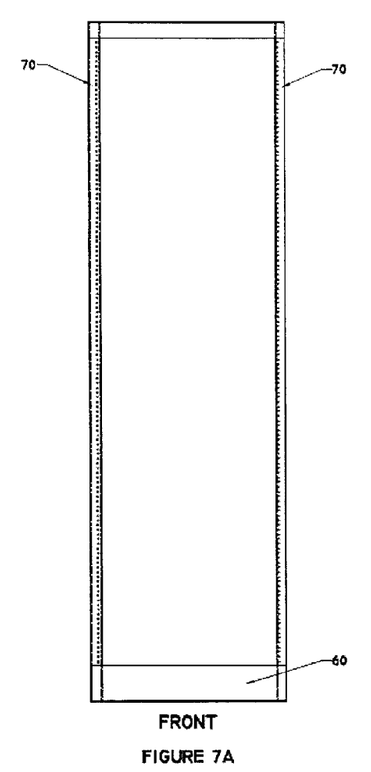
FIG. 7A illustrates a front view of a battery rack.
Figure 7B:
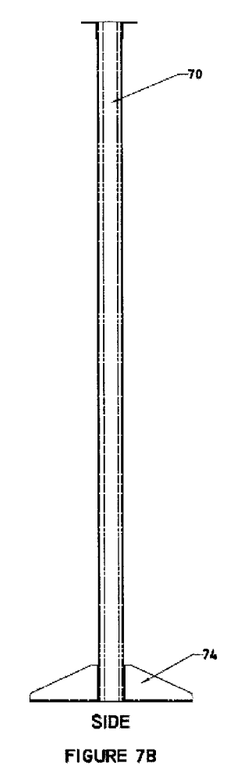
FIG. 7B illustrates a side view of the battery rack of FIG. 7A with one vertical support one each side thereof; and, FIG. 7C illustrates a side view of the battery rack of FIG. 7A with two vertical supports on each side thereof.
Figure 7C:
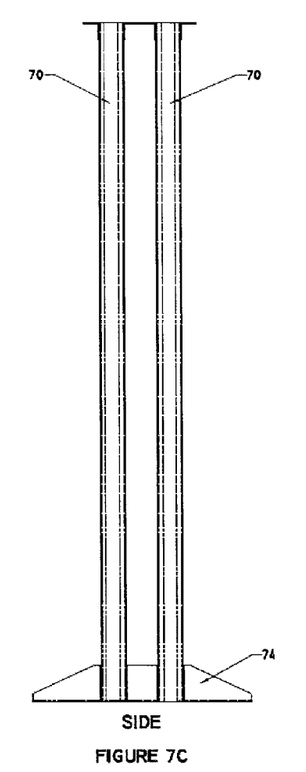

In an alternative, shown in a side elevation view in FIG. 7C, two vertical members 70 *a, b* may be provided on each side of the rack assembly 90. The spacing between the two vertical members 70 *a, b* may be a distance A, where mounting holes on the battery tray are correspondingly spaced as shown in FIG. 6C, or other similar arrangement, so that the battery tray 42 may be attached to the two vertical members 70 *a, b* on each side of the rack 90 by attachment brackets 48 mountable to the holes on the sides 54 of the battery tray 42. Such an arrangement may reduce the bending torque on the attachment brackets 48 between the battery tray 42 and the vertical supports 70 *a, b*.

A first plurality of tiers for receiving batteries are stepped back from the front with respect to a lower tier as the tier rank increases when measured from the base of the cabinet. A second plurality of tiers may be configured, where the lower of the tiers of the second plurality of tiers is not referenced to a tier in the first plurality of tiers.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

What is claimed is:

1. A method of housing a plurality of storage batteries in a battery power supply, the method comprising:
   providing a cabinet;
   providing a plurality of trays;
   mounting a first tray, a second tray and a third tray of the plurality of trays to the cabinet such that support surfaces of the plurality of trays are horizontally disposed and the first tray, the second tray and the third tray are separated by a vertical distance sufficient to insert a storage battery of the plurality of storage batteries into a space formed therebetween;
   providing a restraining device for each of the first tray, the second tray and the third tray;
   providing the plurality of storage batteries, each of the storage batteries having electrical terminals;
   inserting the plurality of storage batteries into the first tray, the second tray and the third tray such that front faces of the storages batteries disposed on the first tray, the second tray and the third tray face in a same direction; and
   removably fastening the restraining device to the respective first tray, the second tray and the third tray such that the storage batteries disposed on the first tray, the second and third trays are inhibited from motion towards a front of the cabinet,
   wherein the respective restraining device fastened to the first tray, the second tray and the third tray is spaced at a consecutively increasing horizontal distance from a plane coincident with front-most structures of the cabinet, the plane being defined over a height range corresponding to the plurality of trays, such that access to the electrical terminals is provided from a direction above the storage battery.

2. The method of claim 1, wherein the step of mounting the first tray, the second tray and the third tray further comprises connecting the first tray, the second tray and the third tray to vertical supports of the cabinet using at least one of screws or nuts and bolts.

3. The method of claim 1, further comprising providing a set of connecting cables; and connecting the storage batteries into a series string using the cables of the set of cables.

4. The method of claim 1, wherein the step of inserting the plurality of storage batteries into the first tray, the second tray and the third tray is by removing the restraining device from the respective tray, positioning a storage battery of the plurality of storage batteries horizontally on the respective first, second, or third tray; sliding the storage battery in a horizontal attitude; and, refastening the restraining device.

5. A method of housing a plurality of storage batteries in a battery power supply, the method comprising:
   providing a relay rack;
   providing a plurality of trays;

mounting a first tray, a second tray and a third tray of the plurality of trays to the relay rack such that support surfaces of the plurality of trays are horizontally disposed and the first tray, the second tray and the third tray are separated by a vertical distance sufficient to insert a storage battery of the plurality of storage batteries into a space formed therebetween;

providing a restraining device for each of the first tray, the second tray and the third tray;

providing the plurality of storage batteries, each of the storage batteries having electrical terminals;

inserting the plurality of storage batteries into the first tray, the second tray and the third tray such that front faces of the storage batteries disposed on the first tray, the second tray and the third tray face in a same direction; and removably fastening the restraining device to the respective first tray, the second tray and the third tray such that the storage batteries disposed on the first tray, the second tray and third trays are inhibited from motion towards a front of the relay rack, wherein the respective restraining device fastened to the first tray, the second tray and the third tray is spaced at a consecutively increasing horizontal distance from a plane coincident with front-most structures of the relay rack, the plane being defined over a height range corresponding to the plurality of trays, such that access to the electrical terminals is provided from a direction above the storage battery.

6. The method of claim 5, wherein the step of mounting the first tray, the second tray and the third tray further comprises connecting the first tray, the second tray and the third tray to vertical supports of the relay rack using at least one of screws or nuts and bolts.

7. The method of claim 5, wherein the step of inserting the plurality of storage batteries into the first tray, the second tray and the third tray is by removing the restraining device from the respective tray, positioning a storage battery of the plurality of storage batteries horizontally on the respective first, second, or third tray; sliding the storage battery in a horizontal attitude; and re-fastening the restraining device.

* * * * *

UNITED STATES PATENT AND TRADEMARK OFFICE
CERTIFICATE OF CORRECTION

PATENT NO.       : 9,112,205 B2  
APPLICATION NO.  : 13/354822  
DATED            : August 18, 2015  
INVENTOR(S)      : William Conrardy et al.

Page 1 of 1

It is certified that error appears in the above-identified patent and that said Letters Patent is hereby corrected as shown below:

In the Claims

In column 6, claim 1, line 34, before "batteries disposed on the first tray," replace "storages" with --storage--.

Signed and Sealed this
Twenty-first Day of June, 2016

Michelle K. Lee
*Director of the United States Patent and Trademark Office*